(12) United States Patent
Duthaler et al.

(10) Patent No.: US 6,506,438 B2
(45) Date of Patent: *Jan. 14, 2003

(54) METHOD FOR PRINTING OF TRANSISTOR ARRAYS ON PLASTIC SUBSTRATES

(75) Inventors: Gregg M. Duthaler, Brookline, MA (US); Peter T. Kazlas, Brookline, MA (US); Paul Drzaic, Lexington, MA (US)

(73) Assignee: E Ink Corporation, Cambridge, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/460,090

(22) Filed: Dec. 14, 1999

(65) Prior Publication Data

US 2002/0053320 A1 May 9, 2002

Related U.S. Application Data

(63) Continuation-in-part of application No. 09/289,036, filed on Apr. 9, 1999.
(60) Provisional application No. 60/112,330, filed on Dec. 15, 1998.

(51) Int. Cl.$^7$ ............... B05D 5/12; B41M 3/12
(52) U.S. Cl. ............ 427/58; 427/146; 427/359; 427/365; 427/369
(58) Field of Search ............ 118/249, 259, 118/261, 304; 427/96, 58, 146, 359, 365, 369

(56) References Cited

U.S. PATENT DOCUMENTS

| | | |
|---|---|---|
| 4,251,747 A | 2/1981 | Burdick |
| 4,298,448 A | 11/1981 | Müller et al. |
| 4,538,156 A | 8/1985 | Durkee et al. |

(List continued on next page.)

FOREIGN PATENT DOCUMENTS

| | | |
|---|---|---|
| EP | 0739020 A2 | 3/1996 |
| JP | 11073004 | 3/1999 |
| JP | 11073083 | 3/1999 |
| JP | 11084953 | 3/1999 |
| JP | 11143201 A | 5/1999 |
| JP | 1116115 A | 6/1999 |
| JP | 11153929 A | 6/1999 |
| WO | WO-7000 A * | 4/1993 |
| WO | WO 93/07000 | 4/1993 |
| WO | WO 95/22085 | 8/1995 |
| WO | WO 95/33085 | 12/1995 |
| WO | WO97/15959 | 5/1997 |
| WO | WO 98/03896 | 1/1998 |
| WO | WO98/30749 | 7/1998 |
| WO | WO 98/41898 | 9/1998 |
| WO | WO 99/53371 | 10/1999 |

OTHER PUBLICATIONS

Hebner et al, "Ink–jet printing of doped polymers for organic light emitting devices", American Institue of Physics, vol. 72, No. 5 1998, pp 519–521.*

Garnier et al., "All–polymer Field–effect trnasistor realized by printing techniques", Science, vol. 265, Sep. 1994, pp. 1684–1686.*

(List continued on next page.)

*Primary Examiner*—Brian K. Talbot
(74) *Attorney, Agent, or Firm*—Testa, Hurwitz & Thibeault, LLP

(57) ABSTRACT

Electronic devices such as transistors and diodes are manufactured by ink-jet printing using a transfer member. These electronic devices are used in addressing an electronic display.

24 Claims, 7 Drawing Sheets

U.S. PATENT DOCUMENTS

| | | | |
|---|---|---|---|
| 4,673,303 | A | | 6/1987 | Sansone et al. |
| 5,099,256 | A | | 3/1992 | Anderson |
| 5,279,511 | A | | 1/1994 | DiSanto et al. |
| 5,372,852 | A | | 12/1994 | Titterington et al. |
| 5,389,958 | A | | 2/1995 | Bui et al. |
| 5,471,233 | A | | 11/1995 | Okamoto et al. |
| 5,502,476 | A | | 3/1996 | Neal et al. |
| 5,602,572 | A | | 2/1997 | Rylander |
| 5,604,027 | A | | 2/1997 | Sheridon |
| 5,619,307 | A | | 4/1997 | Machino et al. |
| 5,625,460 | A | | 4/1997 | Tai |
| 5,648,801 | A | | 7/1997 | Beardsley et al. |
| 5,649,266 | A | | 7/1997 | Rushing |
| 5,672,381 | A | | 9/1997 | Rajan |
| 5,677,719 | A | * | 10/1997 | Ganzow ............ 347/103 |
| 5,699,102 | A | | 12/1997 | Ng et al. |
| 5,709,976 | A | | 1/1998 | Malhotra |
| 5,715,514 | A | | 2/1998 | Williams et al. |
| 5,722,781 | A | | 3/1998 | Yamaguchi |
| 5,738,716 | A | | 4/1998 | Santilli et al. |
| 5,738,977 | A | | 4/1998 | Van Der Sluis-Van Der Voort et al. |
| 5,744,283 | A | | 4/1998 | Spierings et al. |
| 5,751,433 | A | | 5/1998 | Narendranath et al. |
| 5,751,434 | A | | 5/1998 | Narendranath et al. |
| 5,752,152 | A | | 5/1998 | Gasper et al. |
| 5,843,259 | A | | 12/1998 | Narang et al. |
| 5,958,169 | A | * | 9/1999 | Titterington et al. ....... 156/235 |
| 5,961,804 | A | | 10/1999 | Jacobson et al. |
| 6,120,588 | A | * | 9/2000 | Jacobson ............ 106/31.16 |

OTHER PUBLICATIONS

Garnier et al., "All–Polymer Field–Effect Transistor Realized by Printing Techniques," *Science*, Sep. 16, 1994, vol. 265, No. 5179, pp. 1684–1686.

Hebner et al., "Ink–Jet Printing of Doped Polymers for Organic Light Emitting Devices," *American Institute of Physics*, Feb. 2, 1998, vol. 72, No. 5, pp. 519–521.

Drzaic et al., "A Printed and Rollable Bistable Electronic Display," *1998 SID*, May 1998, vol. 29, pp. 1131–1134.

Platt, "Digital Ink," *Wired*, May 1997, pp. 162–210.

Ackerman, J., "E Ink of Cambridge Gets Start–Up Funding," *Boston Globe*, Dec. 24, 1997.

Comiskey et al, "Electrophoretic Ink: A Printable Display Material," *SID 97 Digest*, 1997, pp. 75–76.

Howe, "MIT Book Would Bind Computer 'Ink' to Paper," *Boston Globe*, Mar. 17, 1996, pp. 31,35.

"E Ink Debuts in J.C. Penney Stores," *Boston Herald*, May 3, 1999, pp. 27.

Shiwa. S. et al., "5.6 Electrophoretic Display Method Using Ionographic Technology" *SID 88 Digest*, 1988, pp. 61–62.

"Electronic Book is a Whole Library," *The Sunday Times*, Feb. 25, 1996.

"Electronic Ink' Sign Debuts at JC Penney," *Boston Globe*, May 4, 1999.

Flaherty, "What Did Disappearing Ink Grow Up to Be? Electronic Ink," *The New York Times*, May 6, 1999.

Negroponte et al., "Surfaces and Displays," *Wired*, Jan. 1997, pp. 212.

Comiskey et al, "An Electrophoretic Ink for All–Printed Reflective Electronic Displays," *Nature*, vol. 394, Jul. 16, 1998, pp. 253–255.

Peterson, "Rethinking Ink. Printing the Pages of an Electronic Book," *Science News*, vol. 153, Jun. 20, 1998, pp. 396–397.

Guernsey, "Beyond Neon: Electronic Ink," *New York Times*, Jun. 3, 1999, pp. B11.

Ridley et al, "All–Organic Field Effect Transistors Fabricated by Printing," *Science*, vol. 286, Oct. 22, 1999, pp. 746–748.

Shimoda et al., "Multicolor Pixel Patterning of Light–Emitting Polymers by Ink–Jet Printing," *SID 99 Digest*, May 1999, pp. 377–379.

* cited by examiner

METHOD FOR PRINTING OF TRANSISTOR ARRAYS ON PLASTIC SUBSTRATES

RELATED APPLICATIONS

This invention claims priority to provisional application U.S. Ser. No. 60/112,330 filed on Dec. 15, 1998 and is a continuation-in-part of utility application U.S. Ser. No. 09/289,036 filed on Apr. 9, 1999, the entire disclosure of each application is incorporated herein by reference.

FIELD OF THE INVENTION

This invention generally relates to methods of manufacturing electronic devices, and more specifically to methods of manufacturing non-linear devices for addressing electronic displays.

BACKGROUND OF THE INVENTION

Microencapsulated, particle-based displays can be made highly reflective, bistable, and optically and electrically efficient. To obtain a high resolution display, however, individual pixels of a display must be addressable without interference from adjacent pixels. One way to achieve this objective is to provide an array of nonlinear elements, such as transistors, diodes, or varistors, where one or more nonlinear elements are associated with each pixel.

Most examples of nonlinear elements to date have been fabricated using vacuum-deposited silicon on glass. This process is costly in addition to being complex. The complexity prevents large area devices from being readily constructed. In addition, it is difficult to create silicon transistors on plastic or other flexible film.

Recently, there has been significant development in the area of organic semiconducting polymers and molecules. Thin film transistors have been made out of semiconducting polymers. See Bao et al., *Soluble and Processable Regioregular Poly(3-hexylthiophene) for Thin Film Field-Effector Transistor Applications with High Mobility*, Appl. Phys. Lett. 69(26), 4108 (December 1996); and Bao et al., *High-Performance Plastic Transistors Fabricated by Printing Techniques*, Chem. Mater. 1997, 9, 1299. U.S. Pat. No. 5,574,291 describes addressing liquid crystal displays with transistors made out of semiconducting polymers. While remarkable advances have been made in the performance of organic-based transistors, the mobility characteristics of many organic semiconductor materials and devices are insufficient to successfully drive many types of liquid crystal or emissive displays. Therefore, many organic-based transistors are not suitable for use with liquid crystal displays.

In addition, liquid crystals can degrade the transistors when they come in contact with the transistors. Many organic semiconductor materials can be swollen by, or dissolved by, liquid crystalline fluids because those fluids are good solvents. This solvent compatibility makes it challenging to design systems in which organic transistor devices can remain stable while in contact with or close proximity to liquid crystalline solvents, limiting their viability.

Many organic-based transistors have been made using a screen printing technology, in which the organic material is squeezed through an opening in a mesh to produce fine lines. Lines having a pitch as small as about 250 microns have been printed using the screen printing technology. While this line spacing is adequate for some applications, it is preferable to construct transistors with much smaller features, a goal not readily reached using screen printing.

In addition, the solvent carrier used for supporting screen printable materials must have a certain range of viscosity and surface energy characteristics. Such solvent carriers can potentially interfere with the electrical characteristics of the semiconductor material of the transistors. Finding proper solvent carriers, therefore, is difficult.

SUMMARY OF THE INVENTION

The invention relates to a method of manufacturing an electronic device. In one aspect, an electronic device is manufactured in accordance with the following steps. An ink-jet printing system is provided. The ink-jet printing system includes a print head and a transfer member. A substrate is provided. A plurality of ink drops are dispensed from the print head to a surface of the transfer member forming an ink pattern corresponding to at least a component of the electronic device. The plurality of ink drops can include a conductive material and/or a semiconductive material. The ink pattern is transferred from the transfer member to the substrate, thereby forming the component of the electronic device.

In one embodiment, the ink drops include an organic conductive material and/or an organic semiconductive material. In another embodiment, the ink drops include a colloidal inorganic conductive material and/or a colloidal inorganic semiconductive material, or organometallic material. In one embodiment, the ink drops further includes an insulating material.

In one embodiment, the ink drops form an ink pattern corresponding to at least a component of a transistor, such as a source electrode, a drain electrode, a dielectric layer, a semiconductor layer, or a gate electrode.

In one embodiment, the ink-jet printing system further includes an applicator for applying a release material to the transfer member. For example, the release material can be applied to a surface of the transfer member and the plurality of ink drops can be dispensed adjacent the release material.

In one embodiment, the substrate is provided between the transfer member and a pressure applying member. The substrate can be provided on a conveyor belt. Alternatively, a plurality of substrates can be provided for a batch process. The substrate can be flexible.

In one embodiment, an electronic display media is provided and assembled with the electronic device. The electronic display media can include a plurality of microcapsules, where each capsule includes particles dispersed in a fluid. Alternatively, each microcapsule can include a bichromal sphere.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which.

DETAILED DESCRIPTION OF PREFERRED EMBODIMENTS

Figure 1A:
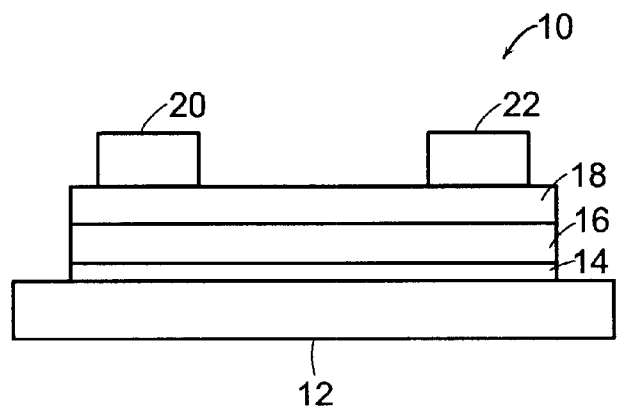
FIG. 1a shows a cross-section view of a transistor according to one embodiment of the present invention.

Referring to FIG. 1a, an organic-based field effect transistor 10 includes a substrate 12, a gate electrode 14 provided on the substrate 12, a dielectric layer 16 provided on the gate electrode 14, an organic semiconductor 18 provided on the dielectric layer 16, and a source electrode 20 and a drain electrode 22 provided on the organic semiconductor 18.

The substrate 12 can be flexible. For example, the substrate 12 can be made of an insulating polymer, such as polyethylene terephthalate (PET), polyester, polyethersulphone (PES), polyimide film (e.g. Kapton, available from Dupont [Wilminton, DE]; Upilex available from Ube Corporation [Japan]), or polycarbonate. Alternatively, the substrate 12 can be made of an insulator such as undoped silicon, glass, or other plastic material. The substrate 12 can also be patterned to serve as an electrode. The substrate 12 can further be a metal foil insulated from the gate electrode 14 by a non-conducting material. The substrate 12 can also be a woven material or paper, planarized or otherwise modified on at least one surface by a polymeric or other coating to accept the other structures.

The gate electrode 14, the source electrode 20, and the drain electrode 22, for example, can comprise a metal such as aluminum or gold. The electrodes 14, 20, 22 can also comprise a conductive polymer such as polythiophene or polyaniline. The electrodes 14, 20, 22 can further include a printed conductor such as a polymer film comprising metal particles such as silver or nickel, a printed conductor comprising a polymer film containing graphite or some other conductive carbon material, or a conductive oxide such as tin oxide or indium tin oxide.

The dielectric layer 16, for example, can comprise a silicon dioxide layer. Alternatively, the dielectric layer 36 can comprise an insulating polymer such as polyimide and its derivatives, poly-vinyl phenol, polymethylmethacrylate, polyvinyldenedifluoride, an inorganic oxide such as metal oxide, an inorganic nitride such as silicon nitride, or an inorganic/organic composite material such as an organic-substituted silicon oxide, or a sol-gel organosilicon glass. The dielectric layer 36 can also comprise a bicylcobutene derivative (BCB) available from Dow Chemical (Midland, Mich.), spin-on glass, or dispersions of dielectric colloid materials in a binder or solvent.

The semiconductor layer 18 can be an organic polymer. In one embodiment, the organic semiconductor comprises a polymeric or oligomeric semiconductor. Examples of suitable polymeric semiconductors include, but are not limited to, polythiophene, poly(3-alkyl)thiophenes, alkyl-substituted oligothiophene, polythienylenevinylene, poly (para-phenylenevinylene) and doped versions of these polymers. An example of suitable oligomeric semiconductor is alpha-hexathienylene. Horowitz, *Organic Field-Effect Transistors,* Adv. Mater., 10, No. 5, p. 365 (1998) describes the use of unsubstituted and alkyl-substituted oligothiophenes in transistors. A field effect transistor made with regioregular poly(3-hexylthiophene) as the semiconductor layer is described in Bao et al., *Soluble and Processable Regioregular Poly(3-hexylthiophene) for Thin Film Field-Effect Transistor Applications with High Mobility,* Appl. Phys. Lett. 69 (26), p. 4108 (December 1996). A field effect transistor made with a-hexathienylene is described in U.S. Pat. No. 5,659,181.

In another embodiment, the organic semiconductor 18 comprises a carbon-based compound. Examples of suitable carbon-based compounds include, but are not limited to, pentacene, phthalocyanine, benzodithiophene, buckminsterfullerene or other fullerene derivatives, tetracyanonaphthoquinone, and tetrakisimethylanimoethylene. The materials provided above for forming the substrate, the dielectric layer, the electrodes, or the semiconductor layer are exemplary only. Other suitable materials known to those skilled in the art having properties similar to those described above can be used in accordance with the present invention.

Figure 1B:
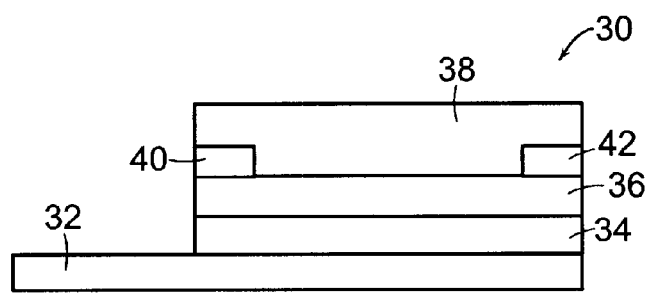
FIG. 1b shows a cross-section view of a transistor according to one embodiment of the present invention.

Referring to FIG. 1b, an organic-based field effect transistor 30 includes a substrate 32, a gate electrode 34 disposed adjacent the substrate 32, a dielectric layer 36 disposed adjacent the gate electrode 34, an organic semiconductor 38 disposed adjacent the dielectric layer 36, and a source electrode 40 and a drain electrode 42 disposed adjacent the dielectric layer 36 and in contact with the semiconductor layer 38.

The field effect transistor configurations provided in FIGS. 1a and 1b are exemplary only. Other transistor designs known to those skilled in the art can be used in accordance with the present invention. For example, a top gate structure in which the source and drain electrodes are placed adjacent the substrate, covered by the semiconductor layer, which in turn is covered by the dielectric and gate electrode, can also be used in accordance with the present invention.

Figure 2:
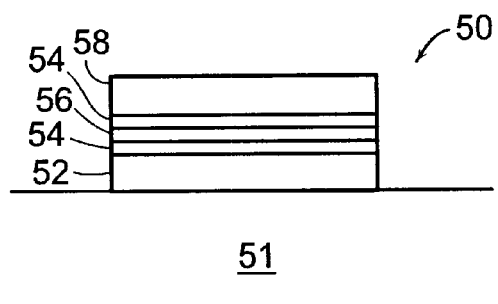
FIG. 2 shows a cross-section view of a diode according to one embodiment of the present invention.

Back-to-back diodes may also be used as a non-linear element in an electronic display. Referring to FIG. 2, a back-to-back organic-based diode 50 includes a substrate 51, a patterned stack of a first conductive layer 52 provided on the substrate 51, a layer 54 of p-type semiconducting material provided on the first conductive layer 52, a layer of n-type 56 semiconducting material provided on the p-type semiconducting layer 54, a second layer of p-type semiconducting material 54' provided on the n-type semiconducting layer 56, and a second conductive layer 58 provided adjacent the second p-type semiconducting layer 54'. In another embodiment, the back-to-back diode is formed by depositing a stack consisting of a first conducting layer, a semiconducting layer, a second conducting layer characterized by a different work function than the first conducting layer, a second semiconducting layer, and a third conducting layer with the same work function as the first conducting layer. For example, gold and aluminum are known to have markedly different work functions and thus can be used as the first conducting layer and the second conducting layer. The diode configuration provided in FIG. 2 is exemplary only.

The substrate 51 can be flexible and be made of various materials discussed above in connection with FIG. 1a, and the conductors 52, 58 can be made of various materials such as conductive polymers or dispersions of conductive particles as discussed above. The semiconducting layers can be made from the organic semiconductors discussed above. Both n-type and p-type organic semiconductors are known to those skilled in the art. Other diode designs known to those skilled in the art can be implemented using the present invention.

According to the present invention, one or more constituent layers of non-linear electronic devices such as the transistors of FIGS. 1a and 1b and the diode of FIG. 2 can be manufactured by ink-jet printing.

Figure 3:
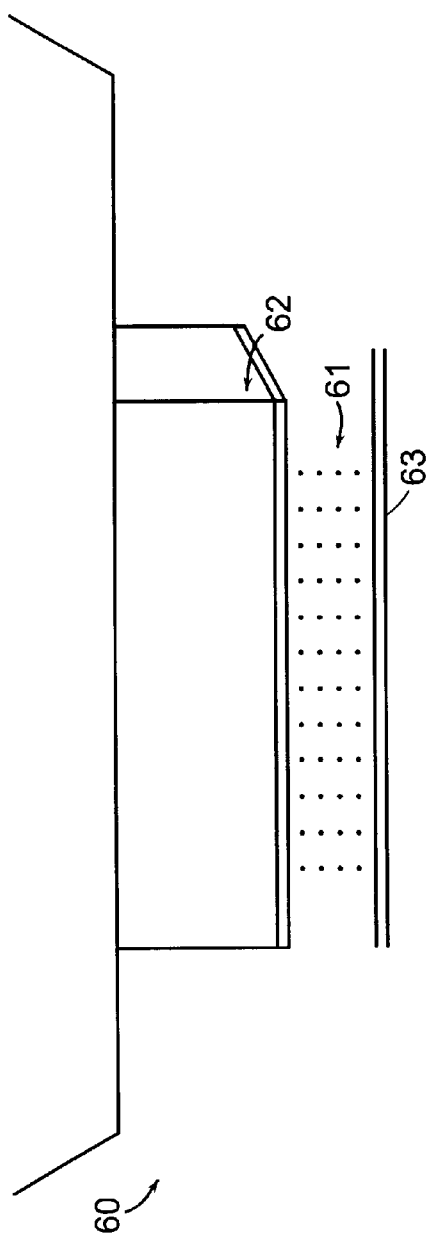
FIG. 3 illustrates ink jet printing according to one embodiment of the present invention.

Referring to FIG. 3, an ink-jet printer 60 includes a print head 62 coupled to a control assembly (not shown). In one embodiment, the print head 62 includes a plurality of orifices for dispensing one or more fluids onto a desired media. For example, one sub-group of orifices can be connected to a reservoir that contains a conducting fluid solution, a second sub-group of orifices can be connected to a reservoir that contains a semiconducting fluid solution, and a third sub-group of orifices can be connected to a reservoir that contains an insulating fluid solution.

In one embodiment, the print head 62 can further include a fourth group of orifices connected to a reservoir that contains a solution comprising a precursor material. The precursor material advantageously affects subsequent deposition of the semiconducting material. The precursor material can be selected from a wide spectrum of available materials including, but not limited to, surface active agents such as octadecyltrichlorosilane (OTS). By modifying the dielectric surface chemistry, the surface active agents can improve the performance of a completed thin film transistors.

In another embodiment, a plurality of print heads, each capable of printing only one constituent material, can be used to deposit each of the materials used to build electronic devices.

In operation, the control assembly applies the necessary control signals to each of the orifices to control the sequence of printing of the various ink materials. The ink drops 61 are dispensed on the substrate 63 through the openings in the print head 62. The print head 62 preferably uses a pulse-on-demand method, and can employ one of the following methods to dispense the ink drops 61: piezoelectric, magnetostrictive, electromechanical, electropneumatic, electrostatic, rapid ink heating, magnetohydrodynamic, or any other technique well known to those skilled in the art. The ink drops 61 dispersed on the substrate 61 form an ink pattern which corresponds to a constituent layer of an electronic device. The ink patterns undergo a curing step or another processing step before subsequent layers are applied.

Figure 4:
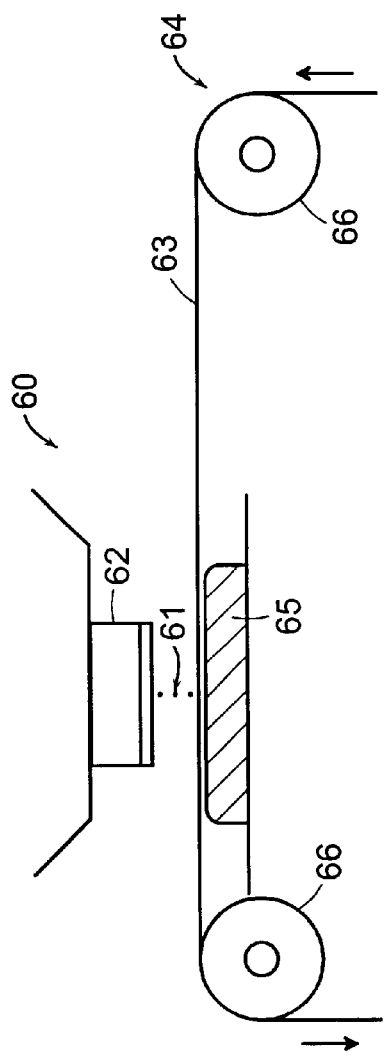
FIG. 4 illustrates ink jet printing according to one embodiment of the present invention.

Referring to FIG. 4, the substrate 63 can be provided on a transport 64 which includes a stage 65 and a pair of rollers 66. The rollers 66 provide continuous movement of the substrate 63 relative to the print head 62 resulting in a continuous printing process. Alternatively, multiple substrates can be processed as a batch.

Figure 5:
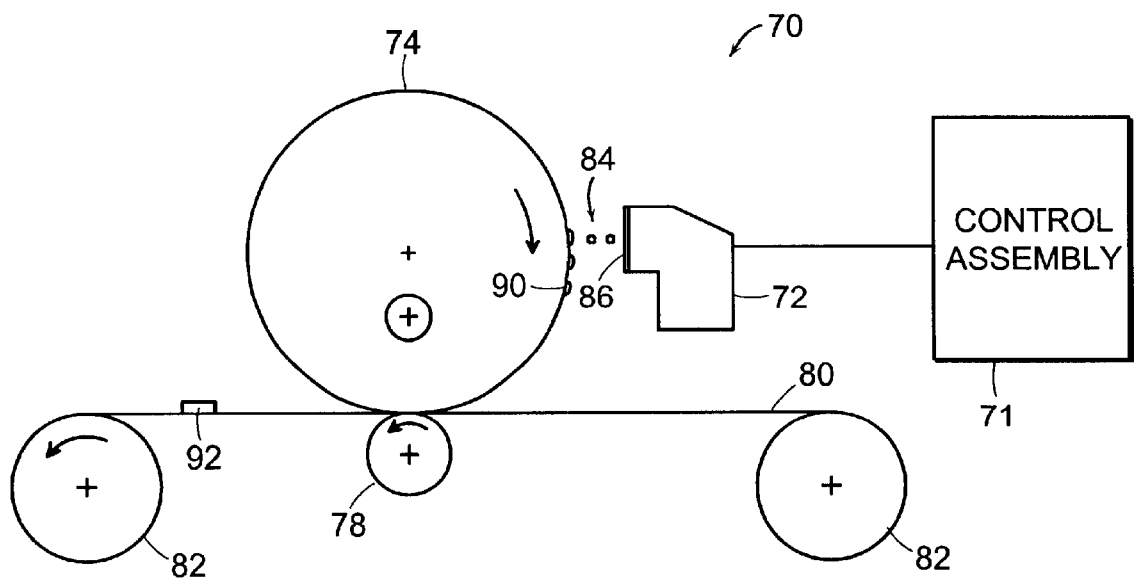
FIG. 5 illustrates ink jet printing using a transfer member according to one embodiment of the present invention.

In one embodiment, an electronic device can be manufactured using an ink-jet printer of FIG. 5. The inkjet printer 70 includes a control assembly 71, a print head 72, a transfer member 74, a tensioner 78, and a transport 82. The control assembly 71 includes sufficient driving electronics to allow for independent control of the dispensing of fluid drops from each of the orifices. The control assembly also regulates the speed at which the transfer member 74 and substrates 80 move through the printer 70.

The transfer member 74 can be a drum. Alternatively, the transfer member 74 can have another configuration sufficient for receiving ink drops to form an ink pattern and for transferring the ink pattern to a substrate 80. The transfer member 74 can include surface material which aids transfer of the ink pattern to the substrate 80. For example, the transfer member 74 can be coated with a thin film of an oil-based material to facilitate the transfer of aqueous-based ink drops from the surface of the transfer member 74. In one embodiment, the transfer member 74 is constructed of a rigid body and a surface material comprising a resilient polymeric material. In another embodiment, the surface of the transfer member 74 can be coated with a non-sticking layer such as silicone, silicone rubber or teflon. In one example, the transfer member 74 is made of an aluminum base material and a surface layer is made from silicon rubber doped with carbon filler to prevent charge accumulation. The transfer member 74 can be rigid or flexible. The transfer member 74 can also be made of a woven material. The material for the transfer member 74 can be chosen on the basis of several parameters, including precision of transfer, mechanical properties, surface properties, durability, and cost.

The tensioner 76 can be a backing roller which, together with the transfer member 74, provides pressure to the substrate 80. Alternatively, the tensioner 76 can have another configuration sufficient to support and provide pressure to the substrate 80. Alternatively, other means of transporting the substrate 80 relative to the transfer member 74 and/or providing pressure to the substrate 80 can be used in accordance with the present invention. The transport 82 can include a pair of rollers as shown in FIG. 5.

In one embodiment, the ink-jet printer 100 further includes a planzarizer for planzarizing the ink pattern provided on the substrate 80.

In operation, a substrate 80 is provided between the transfer member 74 and the tensioner 78. The substrate 80 is delivered to the transfer member 74 through the rollers 82, which continuously move the substrate 80 relative to the transfer member 74.

The control assembly 71 provides appropriate control commands (e.g. voltages) to the print head 72 to cause the print head 72 to dispense droplets of ink. The control assembly 71 produces an independent output signal for each orifice 86 on the print head 72. The signal waveform is selected based upon the print head design, and upon the fluid mechanical properties (e.g. density, viscosity, surface tension) of the ink material. The control assembly also synchronizes the advance speed of the transfer member 74 or the substrate 80 with the print rate.

The print head 72 dispenses ink drops 84 on a surface of the transfer member 74 through the orifices 86. The ink drops 84 can include a semiconductor material, a conductor material and/or an insulator material to form an electronic device. The ink drops can be organic material based or colloidal inorganic material based. The ink drops 84 form an ink pattern 90, which corresponds to a portion of the electronic device, on the surface of the transfer member 74. The transfer member 74 rotates relative to the substrate 80 until the portion of the transfer member 74 having the ink pattern 90 comes in contact with the substrate 80. The ink pattern is transferred from the transfer member 74 to the substrate 80 as the transfer member 74 contacts the substrate 80. The ink pattern transferred to the substrate 80 can subsequently be cooled, cured, or treated further to convert the ink material into a component of the electronic device. These steps are repeated until all the necessary components of an electronic device are printed on the substrate 80. Thereafter, electronic device 92 is formed on the substrate 80. For some ink materials, it is preferable to cure the ink material after deposition on the transfer member 74, but before transferring it to the substrate 80.

Figure 6:
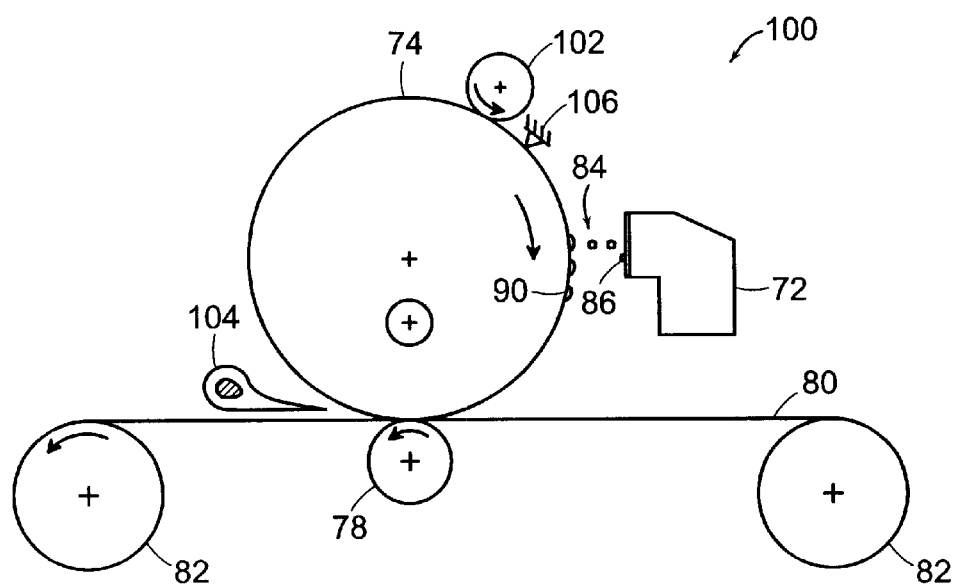
FIG. 6 illustrates ink jet printing using a transfer member according to one embodiment of the present invention.

Alternatively, electronic devices can be manufactured using the ink-jet printer 100 of FIG. 6. The ink-jet printer 100 of FIG. 6 is substantially similar to the ink-jet printer 70 of FIG. 5. In addition to the features of the ink-jet printer 70 of FIG. 5, the ink-jet printer 100 further includes a release agent applicator 102, a blade 106, and a stripper 104.

The release agent applicator 102 can be a squeegee roller which rotates in the direction opposite that of the transfer member 74. The squeegee roller, along with the blade 106, provide a controlled thin coating of a release agent to be provided on a surface of the transfer member 74 prior to dispensing the ink drops on the transfer member 74. The release agent aids transfer of the ink pattern 90 to the substrate 80. The desirable properties of the release agent depend intimately upon the chemistry of the material in the ink drops. It is desirable for the release agent to have the following properties: (1) the ink material should be insoluble in the release agent; (2) the difference between the surface tension of the release agent and the surface tension of the ink material should be such that a contact angle of the at-rest ink drop is less than 90 degrees; (3) the ink drop should be transferred to a substrate without leaving any significant residue on the surface of the transfer member.

The ink-jet printers provided in FIGS. 5 and 6 are exemplary only. Ink-jet printers having other variations known to those skilled in the art can also be used in accordance with the present invention.

The ink-jet printer which uses the transfer member improves the quality of printing, making the printed image more precise. For example, it reduces blurring of the printed image which results from the wicking of the ink into the substrate due to the flow of the liquid based ink. Also, the transfer member's surface may be of much higher quality (smaller surface roughness and more carefully controlled surface chemistry) than that of the substrate. Therefore, the ink pattern transferring from the transfer member to the substrate can be more precise. According to the present invention, small drops of conductor or semiconductor can be deposited in precise locations on a substrate to create fine lines having width smaller than 50 microns, with precisely controlled spaces between the lines.

Using this technique, one or more non-linear devices can be fabricated. For example, a transistor can be constructed as follows. First, a conductive ink solution is deposited in the desired pattern onto the transfer member, transferred to a substrate, and cured or further processed to form a transistor gate. Second, an insulating ink solution is deposited in the desired pattern onto the transfer member, transferred to the substrate adjacent the transistor gate, and cured or further processed to form the gate dielectric. Third, a semiconducting ink solution is deposited in the desired pattern onto the transfer member, transferred to the substrate adjacent the gate dielectric, and cured to form the semiconducting thin film. Finally, the conductive ink solution is again applied in the desired pattern onto the transfer member, transferred to the substrate adjacent the semiconducting thin film, and cured or further processed to form the source and drain structures. This technique may be used to create any of a wide number of thin film transistor structures known to those skilled in the art. Means of curing printed materials to make them solvent resistant are well known to those skilled in the art. Such curing methods include, but are not limited to, heating, photochemical reaction, and solvent evaporation. Diodes and other electronic devices can be manufactured through ink jet printing in a manner similar to that described with respect to a transistor.

Figure 7A:
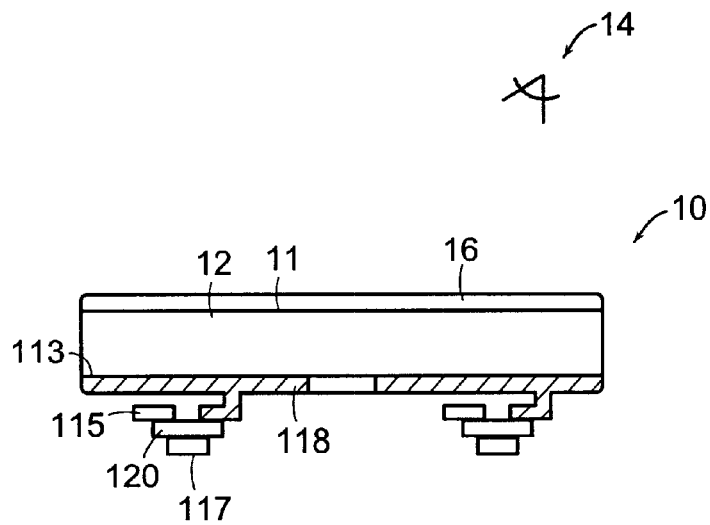
FIG. 7a shows a cross-section view of an electronic display according to one embodiment of the present invention.

The transistors and other electronic devices made in accordance with the present invention and as described above can be used in addressing an electronic display. Referring to FIG. 7a, an electronic display 110 includes a display media 112, a first electrode 116, a second electrode 118, an array of transistors 120, an array of row electrodes 117, and an array of column electrodes 115. The first electrode 116 is disposed on a first surface 111 of the display media 112. In one embodiment, the first electrode 116 comprises a transparent, continuous electrode. The second electrode 118 disposed on a second surface 113 of the display media 112 comprises an array of patterned pixel electrodes 118. Each patterned electrode 118 defines a pixel of the display 110. The transistors 120 are located underneath the pixel electrodes 118. Each transistor 120 is electrically connected to a pixel electrode 118 to address a pixel. A row electrode 117 is electrically connected to all the transistors 120 in that row. A column electrode 115 is electrically connected to all the transistors 120 in that column.

In the display 110 of FIG. 7a, the transistors 120 are located on the backside of the display 110 from the standpoint of the viewer 119. Alternatively, the transistors 120 can be located on the front side of the display 110. In this embodiment, transparent pixel electrodes would be positioned on the first surface 111 of the display media 112, while the continuous electrode would be positioned on the second surface 113 of the display media 112. The continuous electrode need not be transparent.

In one embodiment, the electronic display 110 can be reflective. In this embodiment, the size of the transistors 120 positioned on the backside of the display 110 does not affect the ability of the viewer 119 to view the display 110. Therefore, the size of the transistor 120 can be determined based on manufacturing considerations and transistor performance. The size of the transistor 120 can be in the range from about 1% to about 100% of the area of the pixel transistor 120 addresses. In another embodiment, the electronic display 110 can be transmissive. In this embodiment, the transistors 120 can impede the ability of the viewer 119 to view the display 110. Therefore, the transistors 120 are made as small as possible. In one embodiment, the size of the transistor 120 is less than 50% of the area of the pixel addressed by the transistor 120. In a preferred embodiment, the size of the transistor 120 is less than 20% of the area of the pixel addressed by the transistor 120. In a more preferred embodiment, the size of the transistor 120 is less than 5% of the area of the pixel addressed by the transistor 120.

Figure 7B:
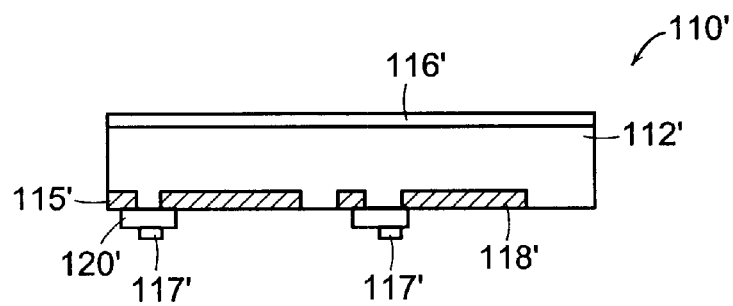
FIG. 7b shows a cross-section view of an electronic display according to one embodiment of the present invention.
Figure 7C:
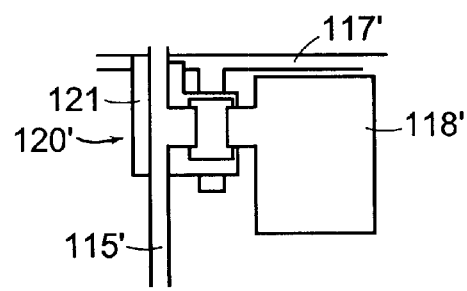
FIG. 7c shows a top view of the electronic display of FIG. 7b with the display media and the first electrode removed.

Referring to FIGS. 7b and 7c, an electronic display 110' includes a display media 112' having a plurality of pixels defined by the second electrodes 118'. The display 110' further includes the first electrode 116', the transistors 120', the row electrodes 117', the column electrodes 115', and an insulator 121. In this embodiment, the transistors 120' are positioned adjacent the pixel electrodes 118'.

In one embodiment, an organic-based field effect transistor is protected by a barrier layer. The barrier layer protects the transistor from air, water, light or other environmental factors to which the transistor can be sensitive. The barrier layer also protects the transistor from the solvent of the display media, if necessary. Where the solvent of the display media has a different polarity from the transistor material, contact between the solvent and the transistor may not affect the transistor properties. However, where the solvent would affect the properties of the transistor upon contact, the barrier layer segregates the solvent and the transistor. In one embodiment, the barrier layer is opaque. In one embodiment, the barrier layer comprises a metal film such as an aluminum film. In another embodiment, the barrier layer comprises a metal oxide coating such as Indium Oxide, Tin Oxide, Indium Tin Oxide, Silicon Monoxide, or Silicon Dioxide coatings. A metal film layer or a conducting oxide film layer may require additional insulating layers to prevent unwanted electrical connections between transistor components. In another embodiment, the barrier layer comprises a polymeric film containing fluorine. In another embodiment, the barrier layer comprises a polymeric film containing absorbing particles or dyes. In still another embodiment, the barrier layer comprises multiple layers of materials including metal and/or insulator. For example, the barrier layer can comprise a multi layer polymer composite film.

Figure 8:
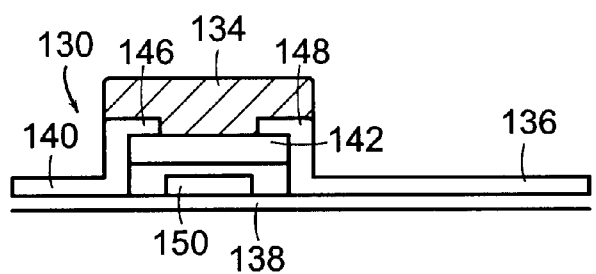
FIG. 8 shows a cross-section view of a transistor according to one embodiment of the present invention.
Figure 9:
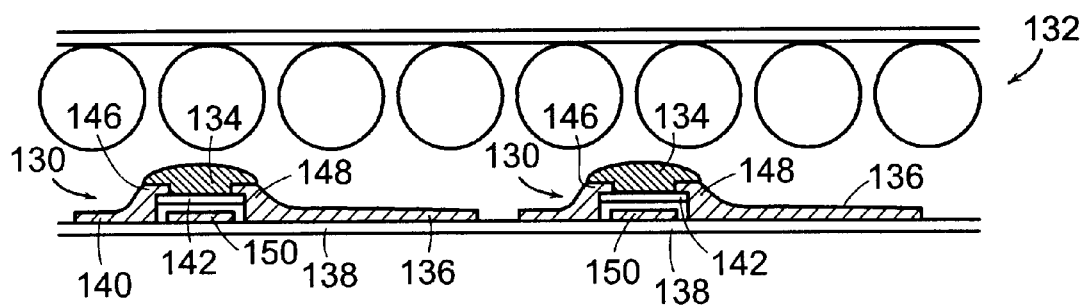
FIG. 9 shows a cross-section view of an electronic display according to one embodiment of the present invention.

Referring to FIGS. 8 and 9, each transistor 130 is individually protected from the display media 132 by a barrier layer 134. Each transistor 130 is positioned adjacent a pixel electrode 136 on a substrate 138. The column electrode 140, and the row electrode (not shown) are also provided on the substrate 138. The barrier layer 134 is positioned over at least the semiconductor layer 142 of the transistor 130 which would otherwise be exposed to the display media 132. Alternatively, the barrier layer 134 can protect the entire transistor 130. The source electrode 146 is connected to the column electrode 140. The drain electrode 148 is connected to the pixel electrode 136. The gate electrode 150 is connected to the row electrode (not shown).

Figure 10:
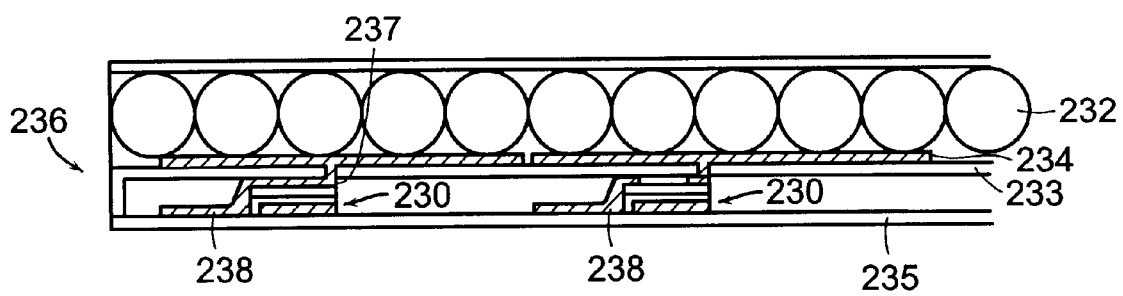
FIG. 10 shows a cross-section view of an electronic display according to one embodiment of the present invention.

Referring to FIG. 10, an array of transistors 230 are protected from the display media 232 with a first barrier layer 233. The array of transistors 230 are positioned on a substrate 235 and placed underneath the pixel electrodes 234. The substrate 235 also functions as a second barrier layer, protecting the transistors 230 from the environment. The edges of the first barrier layer 233 and the second barrier layer 235 are sealed, thereby forming a barrier capsule 236 encapsulating the array of transistors 230. The barrier capsule 236 also encapsulates the column electrodes 238 and the row electrodes (not shown). The first barrier layer 233 includes a plurality of vias for providing an electrical contact between a transistor 230 and its adjacent pixel electrode 234. The vias can be made by etching the first barrier layer 233 to provide a plurality of opening and providing a conductive material inside the openings, thereby providing electrical contact between the drain electrode 237 of the transistor 230 and the pixel electrode 234.

In one embodiment, the display is addressed in the following manner. While a voltage is applied to the gate electrodes on a row, different voltages are applied to each column electrode so that each pixel in that row is driven to a unique state. The characteristics of the transistors prevent pixels on other rows from responding to the column voltages. Each row electrode (gate line) is then scanned in sequence, so that an image can be built up across the entire display. In another embodiment, the electronic display comprises an irregular grouping of pixels and electrodes, rather than a regular x-y grid of electrodes and pixels.

An electronic display comprising a microencapsulated particle-based display media and an organic-based field effect transistor offer numerous advantages.

First, the display can be made inexpensively using a simple manufacturing process. For example, both the organic-based field effect transistor and the display media can be printed. Commonly owned U.S. Pat. No. 6,118,426 filed on Aug. 27, 1998, incorporated herein by reference, describes an electronic display which is printed in its entirety. Since the entire display can be printed, the display can be made large. The display can possess a large number of pixels addressed in a row and column (also known as XY) addressing scheme. The display can also be made using flexible substrates.

Second, the performance requirements for the organic-based field effect transistor when used in this particle-based display is not stringent. Because of low current requirements of the particle-based encapsulated display media, transistors having moderate performance characteristic (i.e., transistor mobility of less than $10^{-3}$ cm$^2$/Vs) can be suitable for driving such display.

Third, since a microencapsulated particle-based display is truly reflective, the underlying substrate need not be transparent. This offers significant design advantages for the combination of organic-based transistors and microencapsulated particle-based displays. For example, the transistor can be as large as the pixel itself.

Fourth, since the microencapsulated particle-based electrophoretic display can be bistable and require updating only occasionally, the organic transistor need not address the display continuously, which will extend the life of the transistor.

Fifth, a microencapsulated particle-based display media prevents fluid from the display media from coming in contact with the transistor device, and provides additional stability for the transistor.

In one embodiment, the display media used in forming the electronic display of FIGS. 7a–7c, 8–10 and 11a–11c comprises a particle-based display media. In one detailed embodiment, the particle-based display media comprises an electronic ink. An electronic ink is an optoelectronically active material which comprises at least two phases: an electrophoretic contrast media phase and a coating/binding phase. The electrophoretic phase comprises, in some embodiments, a single species of electrophoretic particles dispersed in a clear or dyed medium, or more than one species of electrophoretic particles having distinct physical and electrical characteristics dispersed in a clear or dyed medium. In some embodiments the electrophoretic phase is encapsulated, that is, there is a capsule wall phase between the two phases. The coating/binding phase includes, in one embodiment, a polymer matrix that surrounds the electrophoretic phase. In this embodiment, the polymer in the polymeric binder is capable of being dried, crosslinked, or otherwise cured as in traditional inks, and therefore a printing process can be used to deposit the electronic ink onto a substrate.

The optical quality of an electronic ink is quite distinct from other electronic display materials. The most notable difference is that the electronic ink provides a high degree of both reflectance and contrast because it is pigment based (as are ordinary printing inks). The light scattered from the electronic ink comes from a very thin layer of pigment close to the top of the viewing surface. In this respect it resembles an ordinary, printed image. Also, electronic ink is easily viewed from a wide range of viewing angles in the same manner as a printed page, and such ink approximates a Lambertian contrast curve more closely than any other electronic display material. Since electronic ink can be printed, it can be included on the same surface with any other printed material, including traditional inks. Electronic ink can be made optically stable in all display configurations, that is, the ink can be set to a persistent optical state. Fabrication of a display by printing an electronic ink is particularly useful in low power applications because of this stability.

Electronic ink displays are novel in that they can be addressed by DC voltages and draw very little current. As such, the conductive leads and electrodes used to deliver the voltage to electronic ink displays can be of relatively high resistivity. The ability to use resistive conductors substantially widens the number and type of materials that can be used as conductors in electronic ink displays. In particular, the use of costly vacuum-sputtered indium tin oxide (ITO) conductors, a standard material in liquid crystal devices, is not required. Aside from cost savings, the replacement of ITO with other materials can provide benefits in appearance, processing capabilities (printed conductors), flexibility, and durability. Additionally, the printed electrodes are in contact only with a solid binder, not with a fluid layer (like liquid crystals). This means that some conductive materials, which would otherwise dissolve or be degraded by contact with liquid crystals, can be used in an electronic ink application. These include opaque metallic inks for the rear electrode (e.g., silver and graphite inks), as well as conductive transparent inks for either substrate. These conductive coatings include conducting or semiconducting colloids, examples of which are indium tin oxide and antimony-doped tin oxide. Organic conductors (polymeric conductors and molecular organic conductors) also may be used. Polymers include, but are not limited to, polyaniline and derivatives, polythiophene and derivatives, poly3,4-ethylenedioxythiophene (PEDOT) and derivatives, polypyrrole and derivatives, and polyphenylenevinylene (PPV) and derivatives. Organic molecular conductors include, but are not limited to, derivatives of naphthalene, phthalocyanine, and pentacene. Polymer layers can be made thinner and more transparent than with traditional displays because conductivity requirements are not as stringent.

Figure 11A:
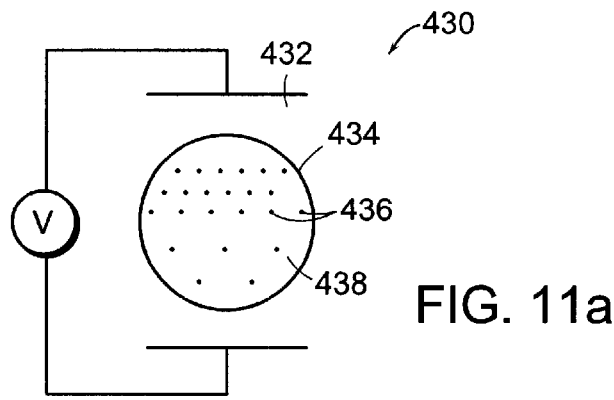
FIG. 11a shows a partial cross-section view of an electronic ink according to one embodiment of the present invention.

FIG. 11a shows an electrophoretic display 430. The binder 432 includes at least one capsule 434, which is filled with a plurality of particles 436 and a dyed suspending fluid 438. In one embodiment, the particles 436 are titania particles. When a direct-current electric field of the appropriate polarity is applied across the capsule 434, the particles 436 move to the viewed surface of the display and scatter light. When the applied electric field is reversed, the particles 436 move to the rear surface of the display and the viewed surface of the display then appears dark.

Figure 11B:
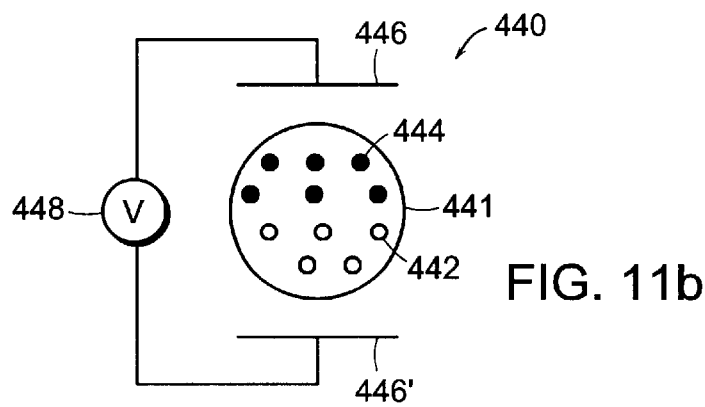
FIG. 11b shows a partial cross-section view of an electronic ink according to one embodiment of the present invention.

FIG. 11b shows another electrophoretic display 440. This display comprises a first set of particles 442 and a second set of particles 444 in a capsule 441. The first set of particles 442 and the second set of particles 444 have contrasting optical properties. For example, the first set of particles 442 and the second set of particles 444 can have differing electrophoretic mobilities. In addition, the first set of particles 442 and the second set of particles 444 can have contrasting colors. For example, the first set of particles 442 can be white, while the second set of particles 444 can be black. The capsule 441 further includes a substantially clear fluid. The capsule 441 has electrodes 446 and 446' disposed adjacent it. The electrodes 446, 446' are connected to a source of voltage 448, which may provide an alternating-current (AC) field or a direct-current (DC) field to the capsule 441. Upon application of an electric field across the electrodes 446, 446', the first set of particles 442 move toward electrode 446', while the second set of particles 444 move toward electrode 446.

Figure 11C:
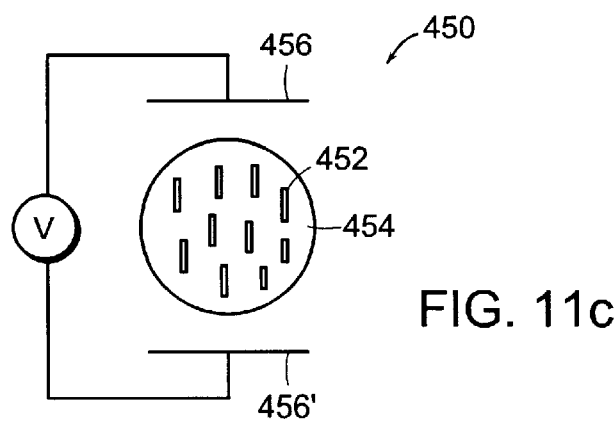
FIG. 11c shows a partial cross-section view of an electronic ink according to one embodiment of the present invention.

FIG. 11c shows a suspended particle display 450. The suspended particle display 450 includes needle-like particles 452 in a transparent fluid 454. The particles 452 change their orientation upon application of an AC field across the electrodes 456, 456'. When the AC field is applied, the particles 452 are oriented perpendicular with respect to the display surface and the display appears transparent. When the AC field is removed, the particles 452 are randomly oriented and the display 450 appears opaque.

The electrophoretic displays provided in FIGS. 11a–11c are exemplary only, and other electrophoretic displays can be used in accordance with the present invention. Other examples of electrophoretic displays are described in commonly owned, copending U.S. Pat. No. 6,120,588 and U.S. patent application Ser. No. 09/140,792 which are incorporated herein by reference.

The successful construction of an encapsulated electrophoretic display requires the proper interaction of a binder for binding the capsules to a substrate, electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Various materials may be used to create electrophoretic displays. Selection of these materials is based on the functional constituents of the display to be manufactured. Such functional constituents include, but are not limited to, particles, dyes, suspending fluids, stabilizing/charging additives, and binders. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as comer cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and uv- or radiation-cured polymers.

While the examples described here are listed using encapsulated electrophoretic displays, there are other particle-based display media that also should work well, including encapsulated suspended particles and rotating ball displays. Other display media, such as liquid crystals and magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials. Further, it may contain surfactants and cross-linking agents, which could aid in coating or durability. The polymer-dispersed electrophoretic display may be of the emulsion or phase separation type.

Figure 11D:
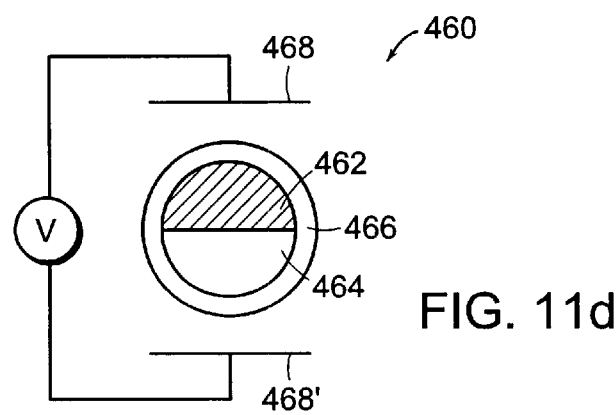
FIG. 11d shows a cross-section view of an electronic ink according to one embodiment of the present invention.

In another detailed embodiment, the display media can comprise a plurality of bichromal spheres shown in FIG. 11d. A bichromal sphere 460 typically comprises a positively charged hemisphere 462 of a first color and a negatively charged hemisphere 464 of a second color in a liquid medium 466. Upon application of an electric field across the sphere 460 through a pair of electrodes 468, 468', the sphere 460 rotates and displays the color of one of the two hemispheres 462, 464.

In one embodiment, an electronic display is created by printing the entire display or a portion of the display. The term "printing" is intended to include all forms of printing and coating, including: premetered coating such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; screen printing processes; electrostatic printing processes; thermal printing processes; and other similar techniques. In a preferred embodiment, the entire display or a portion of the display is ink-jet printed using a transfer member.

Figure 12:
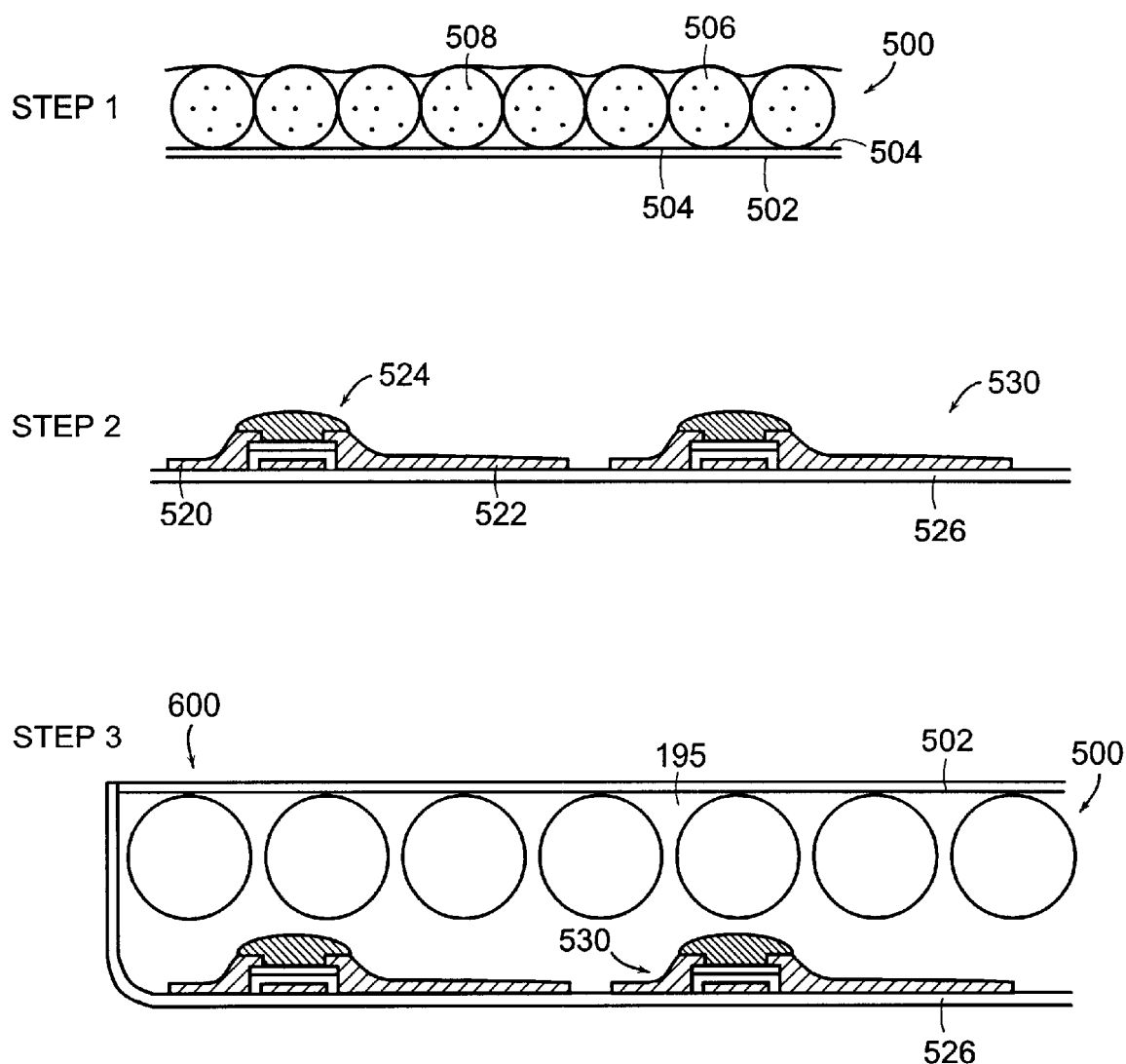
FIG. 12 illustrates a method of assembling an electronic display according to one embodiment.

Referring to FIG. 12, step 1, the display media 500 can be ink-jet printed on a substrate 502 comprising a top electrode 504. In one embodiment, microcapsules, with each capsule comprising electrophoretic particles 508 dispersed in a fluid 510, and a binder 512 can be provided in the print head of an ink-jet printer. The microcapsules 506 and the binder 512 can be dispensed as ink drops on the transfer member of the ink-jet printer to form an ink pattern. The ink pattern is subsequently contact transferred to a substrate 502 comprising a top electrode 504.

In another embodiment, the top electrode 504, itself, is ink-jet printed to form a thin conductive film on the substrate 502 prior to ink-jet printing the microcapsules 506. The ink used to coat the substrate 502 may be a nanocrystalline suspension of indium tin oxide (ITO), or may be selected from a range of electrically conducting polymers. Alternatively, the display media 500 can be prepared using other printing methods or other appropriate non-printing methods known to those skilled in the art.

Referring to FIG. 12, step 2, column electrodes 520, row electrodes (not shown), and pixel electrodes 522, as well as organic-based transistors 524 can be ink-jet printed on a substrate 526 using a transfer member as discussed above. The conductor for forming the electrodes can be any one of the following materials: organic conductor, molten metal, conductive polymer, ITO, and polymer film comprising metal or other conductive particles. Alternatively, the electrodes can be provided using another printing method, evaporation, deposition or other suitable processing methods, while the transistors are ink-jet printed.

Referring to FIG. 12, step 3, the display media 500 provided on the substrate 502 and the electronics 530 provided on the substrate 526 can be assembled to form an electronic display 600. For example, the display media 500 and the electronic 530 can be laminated and sealed for protection.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of manufacturing an electronic device comprising the steps of:
   a) providing an ink-jet printing system comprising a print head and a transfer member;
   b) providing a substrate having a first side;
   c) dispensing a plurality of ink drops from the print head to a surface of the transfer member forming an ink pattern corresponding to at least a first component of the electronic device, the plurality of ink drops comprising at least one of a conductive material, and a semiconductive material; and
   d) transferring the ink pattern from the transfer member to the first side of the substrate, thereby forming the first component of the electronic device.
   e) dispensing a second plurality of ink drops from the print head to the surface of the transfer member forming a second ink pattern corresponding to at least a second component of the electronic device, the second plurality of ink drops comprising at least one of the conductive material, an insulating material and the semiconductive material; and
   f) transferring the second ink pattern from the transfer member to the first side of the substrate, thereby forming the second component of the electronic device in contact with the first component.

2. The method of claim 1 wherein the ink-jet printing system further comprises an applicator for applying a release material to the transfer member.

3. The method of claim 1 wherein step b) comprises providing the substrate on a conveyor belt.

4. The method of claim 1 wherein step b) comprises providing a plurality substrates as a batch.

5. The method of claim 1 wherein the substrate is provided between the transfer member and a pressure applying member.

6. The method of claim 1 wherein the plurality of ink drops further comprises an insulating material.

7. The method of claim 1 wherein the plurality of ink drops form an ink pattern corresponding to at least a component of a transistor.

8. The method of claim 1 further comprising the step of applying a release material to a surface of the transfer member and step c) comprises dispensing the plurality of ink drops adjacent the release material.

9. The method of claim 1 further comprising rotating the transfer member between steps c) and d).

10. The method of claim 1 wherein step c) comprises dispensing a plurality of ink drops by applying a voltage signal to the print head.

11. The method of claim 9 further comprising providing a controller for controlling an application of the voltage signal.

12. The method of claim 1 wherein step b) comprises providing a flexible substrate.

13. The method of claim 1 wherein the plurality of ink drops comprises at least one of an organic conductive material and an organic semiconductive material.

14. The method of claim 1 wherein the plurality of ink drops comprises at least one of a colloidal inorganic conductive material and a colloidal inorganic semiconductive material.

15. The method of claim 1 wherein the plurality of ink drops comprises at least one of a conductive material and a semiconductive material, forming an ink pattern comprising at least one of a source electrode, a drain electrode, a semiconductor layer, and a gate electrode.

16. The method of claim 1 further comprising the step of planarizing the electronic device.

17. The method of claim 1 wherein the plurality of ink drops form an ink pattern corresponding to the electronic device and an electronic display media adjacent the electronic device.

18. The method of claim 1 further comprising providing an electronic display media and assembling the electronic device with the electronic display media.

19. The method of claim 18 wherein the electronic display media comprises a plurality of microcapsules, each capsule including a plurality of particles dispersed in a fluid.

20. The method of claim 18 wherein the electronic display media comprises a plurality of microcapsules, each capsule includes a bichromal sphere dispersed in a fluid.

21. The method of claim 1 wherein step c) comprises dispensing a plurality of ink drops forming the ink pattern having a width of less than about 50 microns.

22. The method of claim 1 wherein step d) comprises transferring the ink pattern to an object provided on the substrate and registering the placement of the ink pattern relative to the object.

23. The method of claim 22 wherein the object comprises one of a registration mark, a conductive pattern, and another electronic device.

24. The method of claim 1 wherein the plurality of ink drops form an ink pattern corresponding to at least a component of a diode.

* * * * *